(12) United States Patent
Grego

(10) Patent No.: US 7,750,791 B2
(45) Date of Patent: Jul. 6, 2010

(54) METHOD OF AND APPARATUS FOR LONG DISTANCE READING OF PASSIVE TAGS IN RADIO FREQUENCY IDENTIFICATION SYSTEMS

(75) Inventor: Giorgio Grego, Turin (IT)

(73) Assignee: Telecom Italia S.p.A., Milan (IT)

( * ) Notice: Subject to any disclaimer, the term of this patent is extended or adjusted under 35 U.S.C. 154(b) by 1082 days.

(21) Appl. No.: 10/580,042

(22) PCT Filed: Nov. 20, 2003

(86) PCT No.: PCT/EP03/13006

§ 371 (c)(1),
(2), (4) Date: May 19, 2006

(87) PCT Pub. No.: WO2005/055121

PCT Pub. Date: Jun. 16, 2005

(65) Prior Publication Data

US 2007/0075831 A1    Apr. 5, 2007

(51) Int. Cl.
*H04Q 5/22* (2006.01)
(52) U.S. Cl. .................... 340/10.2; 340/10.3; 340/10.4; 340/10.5
(58) Field of Classification Search ................ 340/10.2, 340/10.3, 10.4, 10.5, 825.69, 825.7, 572.4, 340/572.7; 342/343
See application file for complete search history.

(56) References Cited

U.S. PATENT DOCUMENTS

| | | | |
|---|---|---|---|
| 4,370,653 A * | 1/1983 | Crowley | ............... 342/42 |
| 5,387,916 A | 2/1995 | Cohn | |
| 5,400,036 A | 3/1995 | Kochiyama et al. | |
| 5,960,350 A | 9/1999 | Schorman et al. | |
| 6,184,841 B1 | 2/2001 | Shober et al. | |
| 6,185,440 B1 * | 2/2001 | Barratt et al. | ............ 455/562.1 |
| 6,335,685 B1 | 1/2002 | Schrott et al. | |
| 6,522,898 B1 | 2/2003 | Kohno et al. | |
| 2003/0058155 A1 | 3/2003 | Landt | |

FOREIGN PATENT DOCUMENTS

| | | |
|---|---|---|
| EP | 0 951 090 | 10/1999 |
| JP | 53-15046 | 2/1978 |
| JP | 58-127411 | 7/1983 |

(Continued)

OTHER PUBLICATIONS

Miyamoto et al., "An Active Integrated Retrodirective Transponder for Remote Information Retrieval-on-Demand", IEEE Transactions on Microwave Theory and Techniques, vol. 49, No. 9, pp. 1658-1662, (2001).

*Primary Examiner*—Vernal U Brown
(74) *Attorney, Agent, or Firm*—Finnegan, Henderson, Farabow, Garrett & Dunner, L.L.P.

(57) ABSTRACT

A method and an apparatus for reading passive tags affixed to objects to be identified and tracked by a radio frequency identification system are disclosed. An interrogating station sends radio-frequency inquiry signals toward the passive tags through an antenna array and receives the response signals from the tags through the same array. Electronic circuitry for processing such response signals has a phase conjugator submitting each received signal to phase conjugation, and the phase-conjugated signals are back transmitted to the passive tags. Retrodirectivity of the antenna array obtained through the phase conjugation allows a precise object identification and tracking also at relatively long distances.

21 Claims, 3 Drawing Sheets

FOREIGN PATENT DOCUMENTS

| | | |
|---|---|---|
| JP | 2-279025 | 11/1990 |
| JP | 6-188784 | 7/1994 |
| JP | 6-327172 | 11/1994 |
| JP | 2001-505025 | 4/2001 |
| JP | 2001-322718 | 11/2001 |
| JP | 2002-271229 | 9/2002 |

* cited by examiner

METHOD OF AND APPARATUS FOR LONG DISTANCE READING OF PASSIVE TAGS IN RADIO FREQUENCY IDENTIFICATION SYSTEMS

CROSS REFERENCE TO RELATED APPLICATION

This application is a national phase application based on PCT/EP2003/013006, filed Nov. 20, 2003, the content of which is incorporated herein by reference.

FIELD OF THE INVENTION

The present invention refers to radio frequency identification (RFID) systems, and more particularly it concerns a method of and an apparatus for reading passive tags in one such system.

BACKGROUND OF THE INVENTION

Radio frequency identification systems are radio communication systems used for identifying and tracking objects for a variety of applications, such as automatic toll collection, electronic shelf labelling, management of the stocks in a store, etc. In such systems, communication takes place between an interrogating station (a radio transceiver) and tags (transponders) applied to the individual objects to be identified and tracked and carrying suitable information about the object (e.g. serial number, price . . . ).

The tags may be active or passive. An active tag synthesises a radio frequency carrier that is modulated by the information recorded on the tag itself and is transmitted to the interrogating station. In case of passive tags, the interrogating station transmits a radio frequency inquiry signal to the tag, which uses the inquiry signal to energise its antenna and reflects the received signal to the interrogating station, after having modulated such signal by the information recorded on the tag. Passive tags are used whenever a low cost of the tag is an essential condition, as is for instance the case of RFID systems intended to manage stocks in a store. The present invention concerns RFID systems with passive tags.

A problem encountered with many conventional RFID systems using passive tags is the limited range operation, which typically is less than 1 m, e.g. about 80 cm. This is due to the need of using omnidirectional antennas in order the interrogating station can interrogate tags scattered in the space where the system operates. Thus the tags receive (and therefore reflect) only a small fraction of the total power transmitted by the interrogating station. Moreover, the signals transmitted by the interrogating station and by the tags may undergo reflections by the walls, the shelves on which the objects are located, etc., so that they are affected by a lot of noise. Thus, if the distance between the interrogating station and the tags is too long, the signals could be too weak to activate the tags and the signal-to-noise ratio could be too low to allow reliable detection at the interrogating station of the information transmitted by a tag.

Some solutions have already been proposed to extend the operating range of passive tag RFID systems.

For instance, U.S. Pat. No. 6,184,841 B1 discloses a system, especially intended for tracking cargo containers, in which the interrogating station uses a single transmitting planar antenna and a receiving antenna consisting in a linear array of planar antennas. The arrangement is such that the horizontal width of the uplink beam is greatly reduced with respect to the horizontal width of the downlink beam. For instance, a horizontal beamwidth of 30° is indicated for the uplink beam, whereas the downlink beam has a horizontal beamwidth of 60°. The reduced beamwidth results in a higher antenna gain, improving the performance of the uplink signal as to both reliability and range of operation, which is extended up to some metres.

The known system however is still unsatisfactory. It requires two different antenna systems at the interrogating station, and this makes the system more complex and therefore more expensive. Moreover, the system can only detect tags on the line-of-sight of the antenna: the system can be used for identifying objects when passing by the interrogating station, but it is not able to track them while being displaced within a warehouse, a container or the like.

The document "An active integrated retrodirective transponder for remote information retrieval-on-demand", by R. Y. Miyamoto et al., IEEE Transactions on Microwave Theory and Technique", 49(9), pages 1658-1662, September 2001, discloses a RF tag including active circuitry that effects phase conjugation of inquiry signals sent by a base station, as well as an amplification of the signals sent back to the base station. This solution allows increasing the operating range and dispensing with the need for the tag to be in the line-of-sight of the antenna of the base station. Yet a system using phase conjugators in the tags is complex and expensive. Moreover, there is the need of powering each tag.

Thus, the invention aims at solving the above problems, by providing a method of and an apparatus for reading tags in a RFID system by using an antenna array, which system allows a long range of operation without need for active circuitry in tags, and does not require that the tag is on the line-of-sight of the antenna of the interrogating station, so that a tracking of the tagged objects is possible.

SUMMARY OF THE INVENTION

That aim is achieved according to the invention thanks to a phase conjugation of the tag responses performed at the interrogating station. Phase conjugation makes the antenna array retrodirective, so that the tag can be tracked even when it is not on the line-of-sight of the array. The energy of the phase-conjugated signal transmitted back by the array is concentrated on the corresponding tag, so that, for a given transmission power from the interrogating station, the signal received at a tag has sufficient power to energise the tag antenna and to give rise to a reflected signal with sufficiently high signal-to-noise ratio even for rather long operating ranges.

In a first aspect, the invention provides a method of reading passive tags in a radio-frequency identification system, in which an interrogating station comprising an antenna array sends radio frequency inquiry signals towards passive tags affixed to objects to be identified and tracked, and each tag associates information identifying the respective object with the received inquiry signal to form a response signal that is reflected towards the interrogating station and is processed therein. The absolute value and the phase of the response signals received at each antenna in the array are detected, each received response signal is submitted to phase conjugation thereby generating a respective phase-conjugated signal, and the phase conjugated signals are transmitted back to the passive tags for object tracking.

According to a second aspect of the invention, there is provided an apparatus for carrying out the method, in which the interrogating station comprises an antenna array transmitting the inquiry signals and receiving the response signals, and a control unit connected to the array is arranged to detect and temporary store the absolute value and the phase of each response signals received at each antenna of an antenna array. The control unit is also connected with a phase conjugator generating the phase-conjugated signal of each received signal and supplying the phase conjugated signals to a radio frequency generator connected to the antenna array, for back transmission of the phase conjugated signals to the passive tags for object tracking.

Further features of the invention are set forth in the depending claims.

BRIEF DESCRIPTION OF THE DRAWINGS

The invention will be better understood from the following description of a preferred embodiment thereof, given by way of non-limiting example, with reference to the accompanying drawings, in which.

DESCRIPTION OF THE PREFERRED EMBODIMENT

Figure 1:
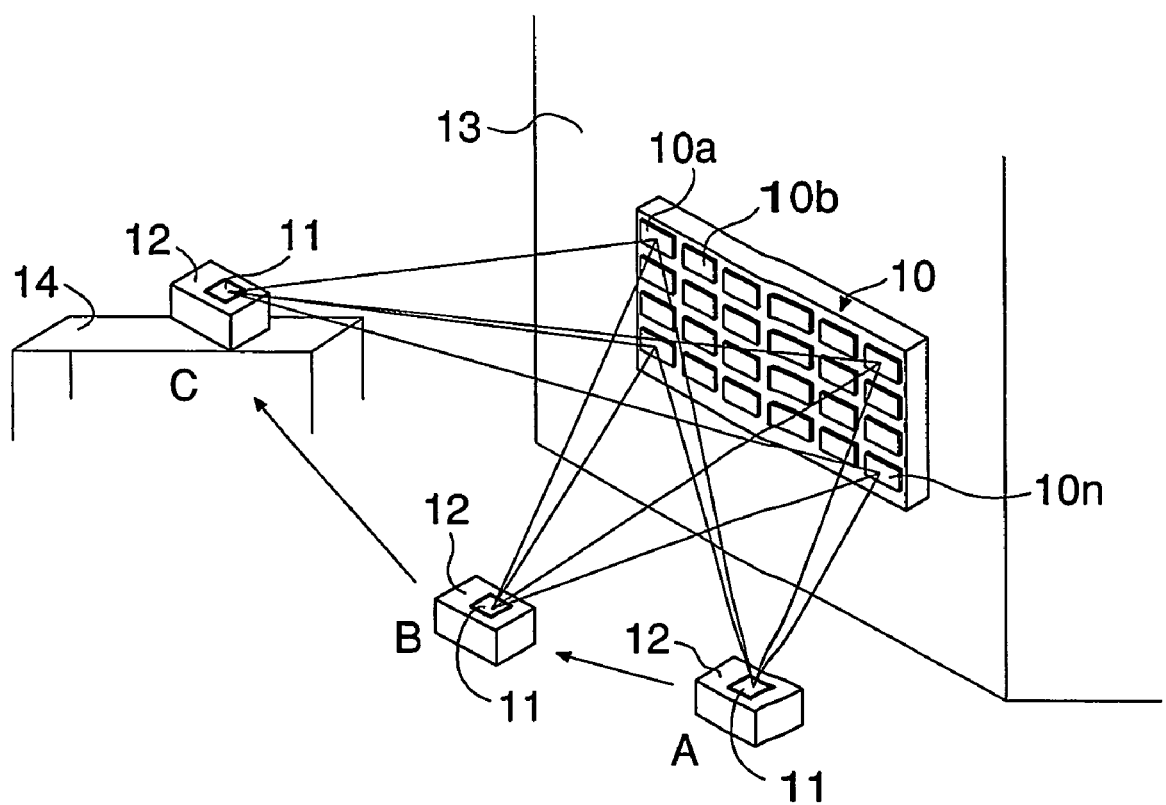
FIG. 1 is a schematic representation of an RFID system using the present invention.

Referring to FIG. 1, an RFID system using the present invention comprises an interrogating station, including a receiving-transmitting antenna array 10 made of a plurality of elements 10a . . . 10n (for instance, a 10×10 array), and a plurality of passive tags or transponders 11 each affixed to an object 12 to be identified and tracked. One of said objects is shown in the drawing at three different positions marked A, B and C. Tags 11 are wholly conventional. The interrogating station further comprises electronic circuitry for generating the inquiry signal and processing the responses from tags 11, in such a manner as to allow identifying and tracking objects 12 to which tags 11 are affixed. The electronic circuitry is incorporated in antenna array 10 and will be discussed below with reference to FIG. 2.

The boresight gain of an array antenna, having N×M elements, where N>>1, M>>1 and d<λ, can be calculated as:

$$G = \frac{4\pi A}{\lambda^2}$$

where λ is the wavelength, d is the distance between elements and A is the area of the antenna $A=(M-1)(N-1)d^2$.

Using for example a 10×10 antenna array, having a gain of at least 10 dB, an operation range of 10 metres or more can be easily achieved.

The position of antenna 10 will depend on the specific application of the system. For instance, in case of application to the transportation and storage of goods, antenna 10 can be located at the side of or above the door of a warehouse, a container, a truck or the like (hereinafter referred to as "storage room") into or from which the goods are to be put or taken. The drawing shows an antenna located on a wall 13 of a warehouse.

As in the conventional RFID systems using passive tags, interrogating antenna 10 emits a radio frequency (RF) inquiry signal with a power and a frequency conforming to the existing regulations on that kind of systems. For instance, the RF signal will be 12 MHz, 850-950 MHz, 2.4-2.5 GHz. The inquiry signal is received by tag 12, is modulated by the data stored on the tag itself and thereafter is reflected to antenna 10. The RF signal supplies the tag with the power required to transmit the data to antenna 10.

According to the invention, the electronic circuitry associated with antenna 10 is arranged to perform a phase conjugation of the signals arriving at each antenna element 10a . . . 10n from tags 11, and to retransmit the phase conjugated signals towards the tags. Due to the phase conjugation, the retransmitted signal is directed towards the concerned tag 11 without need of a prior knowledge of the tag position and without need for the tag to be in the line-of-sight of antenna 10. Thus, antenna 10 is a retrodirective antenna array that provides an omni-directional coverage while maintaining a high level of antenna gain.

Figure 2:
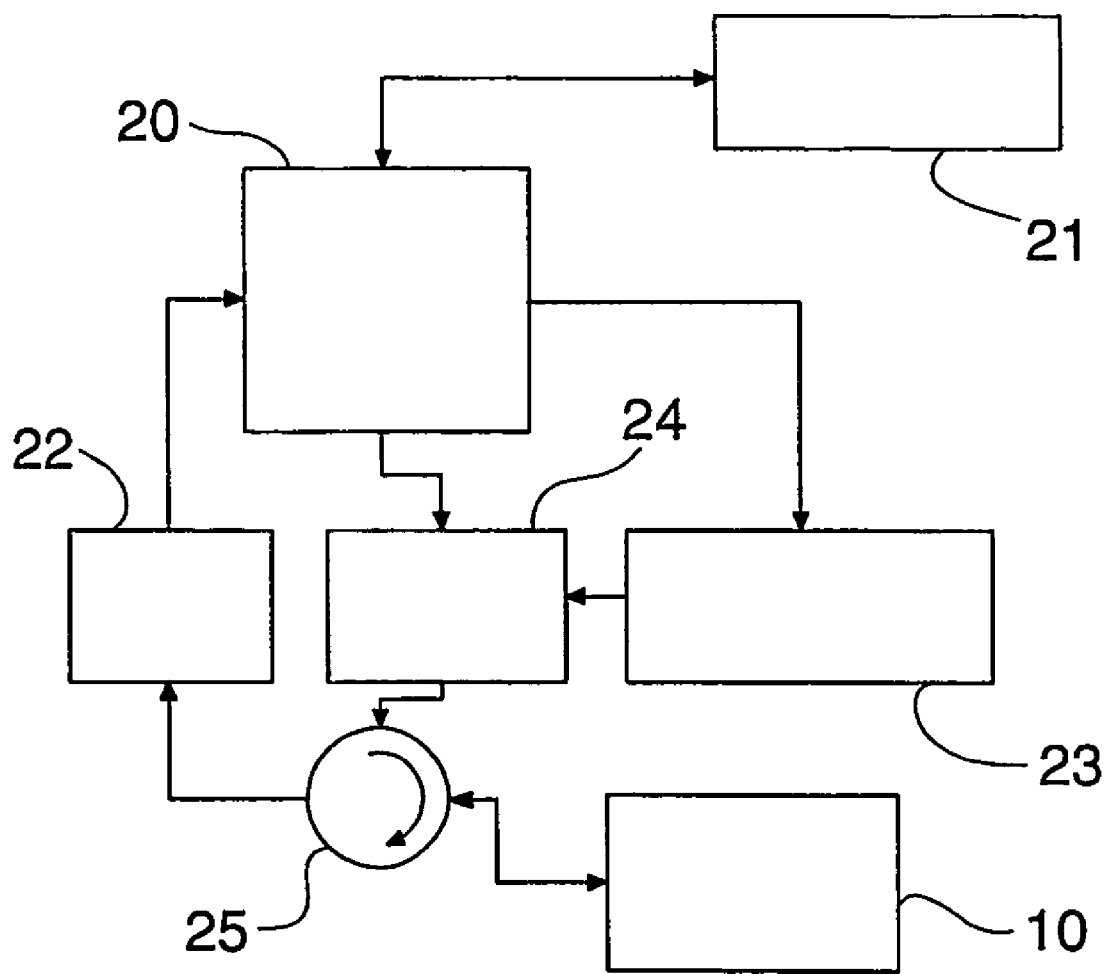
FIG. 2 is a block diagram of the electronic circuitry of the apparatus of the invention.

A block diagram of the circuitry is shown in FIG. 2, where reference numeral 10 still denotes the antenna array. The circuitry comprises a microprocessor 20 intended to process and store, by using a memory 21 such as a RAM and/or an EPROM or the like and a suitable program code, the signals received from tags 11 through a receiver 22 and the signals to be transmitted to the tags. The signal received from a tag 11 will be decoded by microprocessor 20 and phase conjugated in a phase conjugator 23 controlled by microprocessor 20. Phase conjugators are well known in the art. An embodiment is disclosed for instance in the above-mentioned paper by R. Y. Miyamoto et al., which shows a phase conjugator to be used in connection with a 4-element retrodirective array and providing also for amplification of the signals to be sent back to a source. The output of phase conjugator 23 is fed to a radio frequency generator 24 which generates the inquiry signal and tracking signals for the different tags 11. A circulator 25 between array 10 on the one side, and receiver 22 and generator 24 on the other side, separates the receiving and transmitting paths from and to antenna 10.

The operation of the system will be now described with reference to FIGS. 1 and 2, considering for sake of clarity the above-mentioned application to transportation and/or storage of goods.

As said, antenna 10 continuously emits an inquiry signal from each element 10a . . . 10n, the combination of all these partial inquiry signals resulting in a wide-angle lobe. When a tagged product item 12 enters the storage room passing by antenna 10, at the standard distance for the current technology (position A in FIG. 1), its tag 11 will reflect the received signal after having modulated it with the data stored on the tag. The interrogating station can thus lock the particular product item 12 ("target"). There, microprocessor 20 identifies in conventional manner the target from the received response signals and moreover detects and temporarily stores the absolute value and the phase of each response signal. Microprocessor 20 consequently controls phase conjugator 23 and RF generator 24 so as to supply the antenna with the phase-conjugated signal of the received one and to transmit such phase-conjugated signal back to target 12.

The procedure ("target tracking") continues while the target moves from position A to positions B, C inside the storage room. Thanks to the use of the phase conjugation and to signal amplification, positions B and C can be at far greater distance from antenna 10 than allowed by the conventional technique.

When target 12 has reached its final position (e.g., it has been placed on a shelf 14, position C in FIG. 1), microprocessor 20 detects that the phase and the absolute value of the signals received from that particular tag 11 no longer vary in time, and stores the final position in the location of memory 21 associated with that target. In practice, the absolute values and the phases of the signals received at each element 10a . . . 10n of the array will be stored. From that moment, the phase-conjugated signal of the stored one will be periodically emitted for checking the stationary condition of the target, and tracking will be resumed if or when the target position changes.

If, for any reason, the check fails, i.e. no response is obtained from the concerned tag, microprocessor 20 can start a search procedure, by making the antenna perform a spatial scanning of the storage room, e.g. according to a three-dimensional grid pattern, starting from the last known position and in steps depending on the kinds and sizes of the tagged products and on the arrangement thereof inside the storage room. During the scanning, an iterative check on the echo parameters (amplitude, absolute value and phase) could be effected, and the phase conjugation can be started when an optimised echo is received. The term "optimised" is used herein to indicate that the signal parameters comply with the standards for RFID technology.

Of course, the above-described process is performed in parallel for all product items entering the storage room and moving at its interior.

The tracking process also allows detecting that a product item leaves the storage room.

Figure 3:
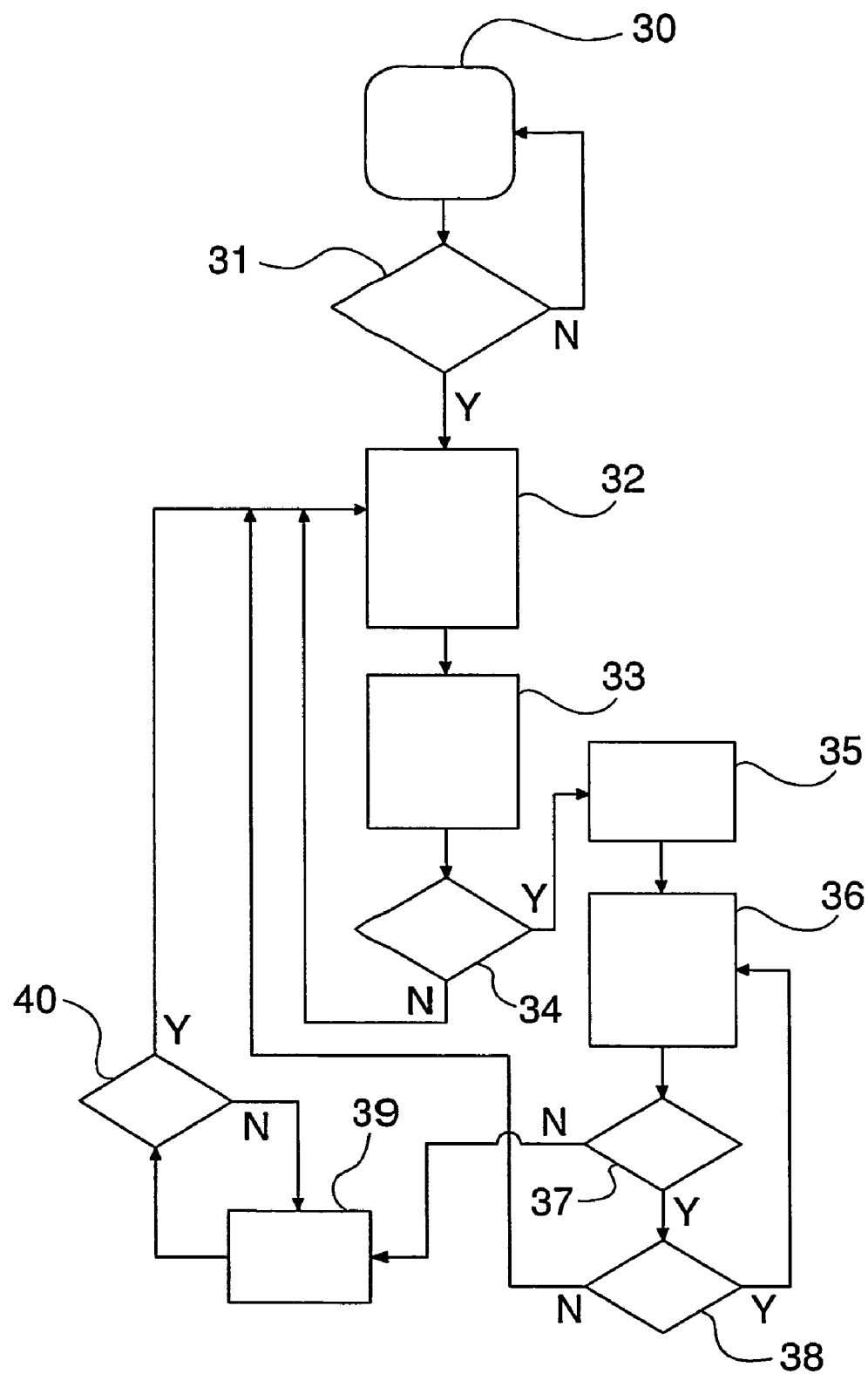
FIG. 3 is a flow chart of the method of the invention.

The operation is also depicted in the flow chart of FIG. 3. At step 30, the interrogating station starts searching for a target by emitting a wide angle lobe, in order to be able to detect tags 11 on items 12 entering the warehouse at different heights above the floor and at different horizontal angular positions. Of course, in such phase, the maximum distance between antenna array 10 and the target could correspond with the operating range of the conventional systems. If an echo (i.e., a response signal) from a tag 11 is received at step 31, the interrogating station will start the tracking phase for the object to which that tag is affixed, otherwise step 30 is repeated. In the tracking phase, at step 32, the received echo signal is phase conjugated and retransmitted to the originating tag, possibly after having been amplified. At step 33, any new echo received from tag 11 is correlated with the echo previously received from the same tag 11. At step 34, it is checked whether the correlation is 1 or not. If the correlation is not 1, the interrogating station returns to step 32. If the correlation is 1, at step 35 the features (absolute value and phase) of the last received echo are stored, and the interrogating station enters a cycle of periodical check on the stationary condition of the tag. At step 36, the phase-conjugated signal of the last-received echo is emitted; at step 37 it is checked whether the echo has been received and, if the check is successful, at step 38 it is checked whether the received echo coincides with the stored one. In the affirmative, the interrogating station returns to step 36, whereas, in the negative, the interrogating station returns to step 32 and the tag tracking is resumed. If the check of step 37 gives a negative outcome, indicating that the concerned object 12 has been displaced to such an extent that the tag no longer receives energy from antenna 10, a focused search (the grid scanning mentioned above) is started at step 39. The scanning goes on until an echo is detected at step 40, afterwards the interrogating station returns to step 32 and resumes the tag tracking.

The above description clearly shows that the system of the invention sends signals aimed at a respective individual tag. Thus, the transmitted energy will be concentrated on the tag and will not become dispersed in areas where no tags exist. Consequently, a tag can be energised and correctly read at far greater distances than those attainable by conventional systems using omni-directional antennas or antenna arrays not providing for phase conjugation. Moreover, retrodirectivity attained by the phase conjugation allows tracking an object whatever the mutual position of antenna 10 and tag 11 is.

Moreover, using a single antenna array for both transmitting the inquiry signals and receiving the echoes makes the system intrinsically simpler.

It is clear that the above description has been given by way of non-limiting example and that changes and modification are possible without departing from the scope of the invention.

For instance, the amplification could be performed by an amplifier separate from the phase conjugator, and the spatial scanning could also be used in the tracking phase, in place of the iterative signal exchange between antenna 10 and tag 11.

Moreover, in the alternative to the wide lobe continuous wave signal, antenna array 10 could emit a first short impulse of high intensity and listen to the pulses coming from the various tags. The absolute value and the phase of such pulses are recorded for each antenna element, are amplified and phase conjugated and are emitted again towards the targets. An iterative cycle is started which continues until the signals from all tags are received clearly and correctly. During the cycle, the emission power can be progressively decreased at each iteration, since each iteration corresponds to an improvement in the concentration of the transmitted energy on the tag. When adopting that alternative solution, more care is to be taken to comply with the regulations and standards concerning emission of electromagnetic radiation, especially if the system is to be used in the presence of persons. However, since the initial strong pulse is to be sent only once, in application like those described in the specification by way of example, the alternative technique could be used in the absence of staff (automatic electronic inventory).

The invention claimed is:

1. A method of reading passive tags in a radio-frequency identification system, wherein an interrogating station comprising an antenna array sends radio-frequency inquiry signals toward passive tags to be identified, and each tag associates information stored thereon with the received inquiry signal to form a response signal that is reflected toward the interrogating station and is processed therein, comprising detecting at the interrogating station an absolute value and a phase of each response signal received at each antenna in the array; submitting each received response signal to phase conjugation, thereby generating a respective phase-conjugated signal; and transmitting the phase conjugated signals back to the passive tags.

2. The method according to claim 1, wherein an amplification of the signals to be transmitted back to the passive tags is performed at the interrogating station.

3. The method according to claim 1, wherein the inquiry signal is a wide angle lobed signal.

4. The method according to claim 1, wherein, for said tag tracking, after back transmission of a phase conjugated signal to a tag, a new response from the tag is waited for by the interrogating station, each new response signal is correlated with the previous one and the operations of phase conjugation of the response signal, back-transmission of the phase-conjugated signal, reception of a new response signal, and correlation of each new response signal with the previous one are iteratively performed until the correlation reveals that the tag is stationary.

5. The method according to claim 4, wherein, after detection of the stationary condition of a tag, the absolute value and the phase of the last received response signal are stored at the interrogating station to mark a steady tag position, and a check is performed on whether the stationary condition is maintained by periodically sending back to the tag the phase-conjugated signal relative to the stored position, the cycle of tag tracking being resumed whenever the tag response during the check of the stationary condition reveals a position variation.

6. The method according to claim 5, wherein, in case the phase-conjugated signal periodically sent back to a tag fails to reach the tag, a search for the tag is effected by means of a spatial scanning of a space in which the tag is located, starting from the last recorded position of the tag.

7. The method according to claim 1, wherein, for said tag tracking, the radio frequency inquiry signals are sent toward the tags through a spatial scanning of a space in which tags are located.

8. The method according to claim 6, wherein, during spatial scanning, parameters characterising the response signals are recorded at the interrogating station, and phase conjugation is performed when a response signal is received at the interrogating station with parameters complying with the standards.

9. The method according to claim 1, wherein the inquiry signal is a high-power short pulse.

10. The method according to claim 9, wherein the power of the phase conjugated signal transmitted back to the tags is progressively decreased at each iteration during the tag tracking.

11. An apparatus for reading passive tags in a radio frequency identification system comprising an interrogating station sending radio-frequency inquiry signals toward the passive tags and receiving from the tags response signals each consisting of an inquiry signal reflected toward the interrogating station after having been associated with information carried by a respective tag, the interrogating station comprising a control unit for controlling the transmission of the inquiry signals and for processing the response signals, the interrogating station comprising an antenna array controlled by the control unit and transmitting the inquiry signals and receiving the response signals, the control unit being arranged to detect and temporarily store an absolute value and a phase of each response signal received at each antenna of the array, and being connected with a phase conjugator submitting each received signal to phase conjugation to generate respective phase-conjugated signal and supplying the phase conjugated signals to a radio frequency generator connected to the antenna array, for back transmission of the phase conjugated signals to the passive tags.

12. The apparatus according to claim 11, wherein the phase conjugator is arranged to amplify the signals to be transmitted back to the passive tags.

13. The apparatus according to claim 11, wherein the control unit is adapted to control the radio frequency generator and the antenna array in order to cause the emission of a wide angle lobed signal forming the inquiry signal.

14. The apparatus according to claim 11, wherein, for said tag tracking, the control unit is arranged, after the back transmission of a phase conjugated signal by the antenna array, to receive a new response from the concerned tag to correlate the new response with the previous one, and to iterate the operations of phase conjugation of the response signal, back-transmission of the phase conjugated signal, reception of a new response signal from a tag and correlation of each new response signal with the previous one until the correlation reveals that the tag has become stationary.

15. The apparatus according to claim 14, wherein said processing unit is connected with a memory in which, after detection of the stationary condition of a tag, the absolute value and the phase of the response signal denoting such condition are stored to mark a steady position of the tag, said control unit being arranged to control the phase conjugator and the radio frequency generator so as to periodically transmit back to the tag the phase-conjugated signal relative to the stored position.

16. The apparatus according to claim 14, wherein, in case the phase-conjugated signal periodically transmitted back to a tag fails to reach the tag, the control unit is arranged to start a search for the tag through a spatial scanning of a space in which the tag is located, starting from the last recorded position of the tag.

17. The apparatus according to claim 15, wherein said control unit is arranged to resume the tag tracking whenever the tag response during the correlation reveals a position variation or when the tag is found during the spatial scanning.

18. The apparatus according to claim 12, wherein, for said tag tracking, the control unit is arranged to control the radio frequency generator and the antenna array so as to effect a spatial scanning of a space in which the tags are located.

19. The apparatus according to claim 16, wherein during said spatial scanning, the control unit is arranged to store parameters of the response signals from the individual tags and to control the phase conjugator so that phase conjugation is performed on the response signal received at the interrogating station with parameters complying with standards.

20. The apparatus according to claim 11, wherein the control unit is arranged to control the radio frequency generator and the antenna array in order to cause the emission of a short, high-power pulse forming the inquiry signal.

21. The apparatus according to claims 20, wherein the control unit is arranged to progressively decrease, at each iteration of the tag tracking cycle, the emission power of the phase-conjugated signals.

* * * * *